United States Patent
Hicks et al.

(10) Patent No.: US 11,176,026 B2
(45) Date of Patent: Nov. 16, 2021

(54) ASSIGNMENT OF TEST CASE PRIORITIES BASED ON COMBINATORIAL TEST DESIGN MODEL ANALYSIS

(71) Applicant: INTERNATIONAL BUSINESS MACHINES CORPORATION, Armonk, NY (US)

(72) Inventors: Andrew C. M. Hicks, Wappingers Falls, NY (US); Ryan Thomas Rawlins, New Paltz, NY (US); Dale E. Blue, Poughkeepsie, NY (US); Brian Mo, Rego Park, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/795,963

(22) Filed: Feb. 20, 2020

(65) Prior Publication Data
US 2021/0263838 A1 Aug. 26, 2021

(51) Int. Cl.
*G06F 11/36* (2006.01)
*G06F 9/48* (2006.01)
*G06F 11/32* (2006.01)

(52) U.S. Cl.
CPC ........ *G06F 11/3688* (2013.01); *G06F 9/4881* (2013.01); *G06F 11/326* (2013.01); *G06F 11/327* (2013.01); *G06F 11/3684* (2013.01); *G06F 11/3692* (2013.01)

(58) Field of Classification Search
None
See application file for complete search history.

(56) References Cited

U.S. PATENT DOCUMENTS

| | | |
|---|---|---|
| 5,860,008 A | 1/1999 | Bradley |
| 5,907,834 A | 5/1999 | Kephart |
| 6,934,656 B2 | 8/2005 | Norman |
| 7,024,589 B2 | 4/2006 | Hartman |
| 7,519,997 B2 | 4/2009 | Shipp |
| 7,761,825 B2 | 7/2010 | Chadha |
| 8,132,056 B2 | 3/2012 | Thakkar |

(Continued)

FOREIGN PATENT DOCUMENTS

WO 1999015966 A1 4/1999

OTHER PUBLICATIONS

Balakrishnan et al., "WYSINWYX: What you see is not what you execute," ACM Transactions on Programming Languages and Systems, vol. 32, No. 6, Article 23, Aug. 2010. 84 pages.

(Continued)

*Primary Examiner* — Qing Chen
(74) *Attorney, Agent, or Firm* — Cantor Colburn LLP; Teddi Maranzano

(57) ABSTRACT

A method for assigning test case priority includes analyzing, based on a set of test vectors, one or more test cases from a set of test cases on source code to determine a particular combination of attribute values associated with the one or more analyzed test cases. The method further includes generating a priority value for each attribute in the determined particular combination of attribute values. A priority value for each of the analyzed one or more test cases is generated based on the generated priority values of the particular combination of attribute values associated with the analyzed one or more test cases.

17 Claims, 4 Drawing Sheets

(56) References Cited

U.S. PATENT DOCUMENTS

| | | | |
|---|---|---|---|
| 8,151,248 B1* | 4/2012 | Butler | G06F 11/368 |
| | | | 717/124 |
| 8,255,861 B2 | 8/2012 | Bhinge | |
| 8,386,851 B2 | 2/2013 | Ur | |
| 8,561,036 B1* | 10/2013 | Beans | G06F 11/368 |
| | | | 717/140 |
| 8,904,536 B2 | 12/2014 | Breitenbacher | |
| 8,972,785 B2 | 3/2015 | Kahne | |
| 9,002,197 B2 | 4/2015 | Dahlfort | |
| 9,003,222 B2 | 4/2015 | Bharmidipaty | |
| 9,026,855 B2 | 5/2015 | Sharma | |
| 9,043,761 B2 | 5/2015 | Artzi | |
| 9,106,548 B2 | 8/2015 | Johnsson | |
| 9,178,755 B2 | 11/2015 | Dahlfort | |
| 9,305,165 B2 | 4/2016 | Snow | |
| 9,317,401 B2 | 4/2016 | Bartley | |
| 9,489,289 B2 | 11/2016 | Hu | |
| 9,569,345 B2 | 2/2017 | Friedler | |
| 9,733,907 B2 | 8/2017 | Goetz | |
| 10,050,993 B2 | 8/2018 | Johri | |
| 10,083,191 B2 | 9/2018 | Barbas | |
| 10,235,277 B2 | 3/2019 | Herzig et al. | |
| 10,831,645 B1 | 11/2020 | McNeil et al. | |
| 2003/0070119 A1 | 4/2003 | Dallin | |
| 2006/0085132 A1* | 4/2006 | Sharma | G06F 11/3688 |
| | | | 702/1 |
| 2007/0094189 A1* | 4/2007 | Yamamoto | G06F 11/3684 |
| | | | 706/45 |
| 2008/0256404 A1 | 10/2008 | Funatsu | |
| 2009/0265694 A1 | 10/2009 | Bakowski | |
| 2009/0292956 A1 | 11/2009 | Rivera | |
| 2011/0066490 A1* | 3/2011 | Bassin | G06Q 30/0249 |
| | | | 705/14.48 |
| 2012/0089964 A1* | 4/2012 | Sawano | G06F 11/3688 |
| | | | 717/124 |
| 2013/0041613 A1* | 2/2013 | Bhide | G06F 11/3688 |
| | | | 702/123 |
| 2013/0047140 A1* | 2/2013 | Shann | G06F 11/3612 |
| | | | 717/128 |
| 2013/0055014 A1 | 2/2013 | Kang | |
| 2013/0061104 A1 | 3/2013 | Hartl | |
| 2013/0013244 A1 | 10/2013 | Kristiansen | |
| 2014/0351793 A1* | 11/2014 | Bartley | G06F 11/3676 |
| | | | 717/124 |
| 2014/0355453 A1 | 12/2014 | Zhang | |
| 2015/0081389 A1 | 3/2015 | Dereszynski et al. | |
| 2016/0034375 A1* | 2/2016 | Sinha | G06F 8/70 |
| | | | 717/131 |
| 2016/0170972 A1 | 6/2016 | Andrejko | |
| 2016/0378647 A1 | 12/2016 | Maeoka et al. | |
| 2017/0068612 A1 | 3/2017 | Herzig et al. | |
| 2017/0083432 A1 | 3/2017 | Dhulipala | |
| 2017/0103013 A1 | 4/2017 | Grechanik | |
| 2018/0101467 A1 | 4/2018 | Hisagi | |
| 2018/0121332 A1 | 5/2018 | Andrejko | |
| 2018/0267102 A1 | 9/2018 | Douskey | |
| 2018/0276108 A1 | 9/2018 | Park | |
| 2018/0307583 A1 | 10/2018 | Yang et al. | |
| 2018/0351788 A1 | 12/2018 | Tammana | |
| 2019/0018753 A1 | 1/2019 | Saha | |
| 2019/0034323 A1 | 1/2019 | M et al. | |
| 2019/0079853 A1 | 3/2019 | Makkar | |
| 2019/0087312 A1* | 3/2019 | Akbulut | G06F 3/04842 |
| 2019/0155722 A1 | 5/2019 | Gupta et al. | |
| 2019/0196950 A1* | 6/2019 | Ranganathan | G06N 20/00 |
| 2019/0332523 A1 | 10/2019 | Gefen et al. | |
| 2019/0340113 A1 | 11/2019 | Earanti et al. | |
| 2020/0285570 A1 | 9/2020 | Knaack et al. | |
| 2020/0349062 A1* | 11/2020 | Coleman | G06F 11/3688 |
| 2021/0042570 A1 | 2/2021 | Skandar et al. | |
| 2021/0064515 A1 | 3/2021 | Xu et al. | |

OTHER PUBLICATIONS

Blue et al., "Interaction-Based Test-Suite Minimization", Proceedings of the 35th International Conference on Software Engineering (ICSE), May 2013. pp. 182-191.

Christodorescu et al., "Static analysis of executables to detect malicious patterns," Proceedings of the 12th USENIX Security Symposium (Security'03), Aug. 4-8, 2003, pp. 169-186.

Gong et al., "JITProf: Pinpointing JIT-unfriendly JavaScript Code," Proceedings of the 2015 10th Joint Meeting on Foundations of Software Engineering (ESEC/FSE 2015). ACM, New York, NY, USA, pp. 357-368.

Herzig et al.; "Empirically Detecting False Test Alarms Using Association Rules", 2015 IEEE/ACM 37th IEEE International Conference on Software Engineering, May 2015. 10 pages.

Hicks et al., "Real Time Fault Localization Using Combinatorial Test Design Techniques and Test Case Priority Selection," U.S. Appl. No. 16/795,961, filed Feb. 20, 2020.

Hicks et al., "Identifying False Positives in Test Case Failures Using Combinatorics," U.S. Appl. No. 16/795,966, filed Feb. 20, 2020.

Mo et al., "Machine Code Analysis for Identifying Software Defects," U.S. Appl. No. 16/795,969, filed Feb. 20, 2020.

Tai Segall, "Combinatorial Test Design," IBM Haifa Research Labs, 2012. 49 pages.

Laghari et al., "Fine-Tuning Spectrum Based Fault Localisation with Frequent Method Item Sets," 31st IEEE/ACM International Conference on Automated Software Engineering (ASE 2016), DOI: 10.1145/2970276.2970308. Sep. 2016. pp. 274-285.

List of IBM Patents or Patent Applications Treated as Related; Date Filed: Mar. 10, 2020, 2 pages.

Noor et al.; "A Similarity-Based Approach for Test Case Prioritization Using Historical Failure Data", 2015 IEEE 26th International Symposium on Software Reliability Engineering (ISSRE), Nov. 2015. 11 pages.

Pearson et al., "Evaluating & improving fault localization techniques," 2017 IEEE/ACM 39th International Conference on Software Engineering (ICSE), DOI: 10.1109/ICSE.2017.62. Feb. 2017. 27 pages.

Rahman et al.; "Prioritizing Dissimilar Test Cases in Regression Testing Using Historical Failure Data", International Journal of Computer Applications: vol. 180, No. 14, Jan. 2018. 8 pages.

Roongruangsuwan et al., "Test Case Prioritization Techniques", Journal of Theoretical and Applied Information Technology, vol. 8, No. 2. pp. 45-60. Aug. 2010.

Segall et al., "Interactive Refinement of Combinatorial Test Plans," Proceedings of the 34th International Conference on Software Engineering (ICSE), Jun. 2012. pp. 1371-1374.

Tzoref-Brill et al., "Visualization of Combinatorial Models and Test Plans", Proceedings of the 31st IEEE/ACM International Conference on Automated Software Engineering, Sep. 2016. pp. 144-154.

Vangala et al.; "Test case Comparison and Clustering Using Program Profiles and Static Execution", Proceedings ol the 7th joint meeting of the European Software Engineering Conference and the ACM SIGSOFT International Symposium on Foundations of Software Engineering, Aug. 24-28, 2009. 2 Pages.

Zheng et al.; "Locating Minimal Fault Interaction in Combinatorial Testing", Hindawi Publishing Corporation, vol. 2016, Article ID 2409521, pp. 1-10, Apr. 19, 2016.

Garcia-Molina, "Pair-Wise Entity Resolution: Overview and Challenges (Invited Talk)," Proceedings of the 15th ACM International Conferene on Information and Knowledgement Management, Nov. 2006, 1 page.

Zheng et al., "Locating Minimal Fault Interaction in Combinatorial Testing," Advances in Software Engineering, vol. 2016, Article ID 2409521, pp. 1-10.

Zhuang et al., "Representation Learing with Pair-wise Constraints for Collaborative Ranking," Proceedings of the Tenth ACM International Conference on Web Search and Data Mining, Feb. 2017, pp. 567-575.

* cited by examiner

ASSIGNMENT OF TEST CASE PRIORITIES BASED ON COMBINATORIAL TEST DESIGN MODEL ANALYSIS

BACKGROUND

The present invention relates generally to fault detection while executing test cases, and more particularly, to assignment of test case priorities based on combinatorial test design model analysis.

Combinatorial test design (CTD) is a testing methodology that seeks to increase test space coverage for a system under test (SUT) through the use of automated algorithms. These algorithms identify input patterns that are most likely to locate problems in the SUT, thereby reducing the amount of time required for a tester to build test cases and an automation framework. CTD is well-adapted for projects that require numerous variations on static input vectors to properly test various system states and logic pathways, which would otherwise be extremely cumbersome for a human tester.

SUMMARY

In one or more example embodiments, a method for assigning test case priority is disclosed. The method includes analyzing, based on a set of test vectors, one or more test cases from a set of test cases on source code to determine a particular combination of attribute values associated with the one or more analyzed test cases. The method further includes generating a priority value for each attribute in the determined particular combination of attribute values. A priority value for each of the analyzed one or more test cases is generated based on the generated priority values of the particular combination of attribute values associated with the analyzed one or more test cases.

In one or more other example embodiments, a system for assigning test case priority is disclosed. The system includes at least one memory storing computer-executable instructions and at least one processor configured to access the at least one memory and execute the computer-executable instructions to perform a set of operations. The operations include analyzing, based on a set of test vectors, one or more test cases from a set of test cases on source code to determine a particular combination of attribute values associated with the one or more analyzed test cases. The operations further include generating a priority value for each attribute in the determined particular combination of attribute values. A priority value for each of the analyzed one or more test cases is generated based on the generated priority values of the particular combination of attribute values associated with the analyzed one or more test cases.

In one or more other example embodiments, a computer program product for assigning test case priority is disclosed. The computer program product includes a non-transitory storage medium readable by a processing circuit, the storage medium storing instructions executable by the processing circuit to cause a method to be performed. The method includes analyzing, based on a set of test vectors, one or more test cases from a set of test cases on source code to determine a particular combination of attribute values associated with the one or more analyzed test cases. The method further includes generating a priority value for each attribute in the determined particular combination of attribute values. A priority value for each of the analyzed one or more test cases is generated based on the generated priority values of the particular combination of attribute values associated with the analyzed one or more test cases.

BRIEF DESCRIPTION OF THE DRAWINGS

The detailed description is set forth with reference to the accompanying drawings. The drawings are provided for purposes of illustration only and merely depict example embodiments of the invention. The drawings are provided to facilitate understanding of the invention and shall not be deemed to limit the breadth, scope, or applicability of the invention. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
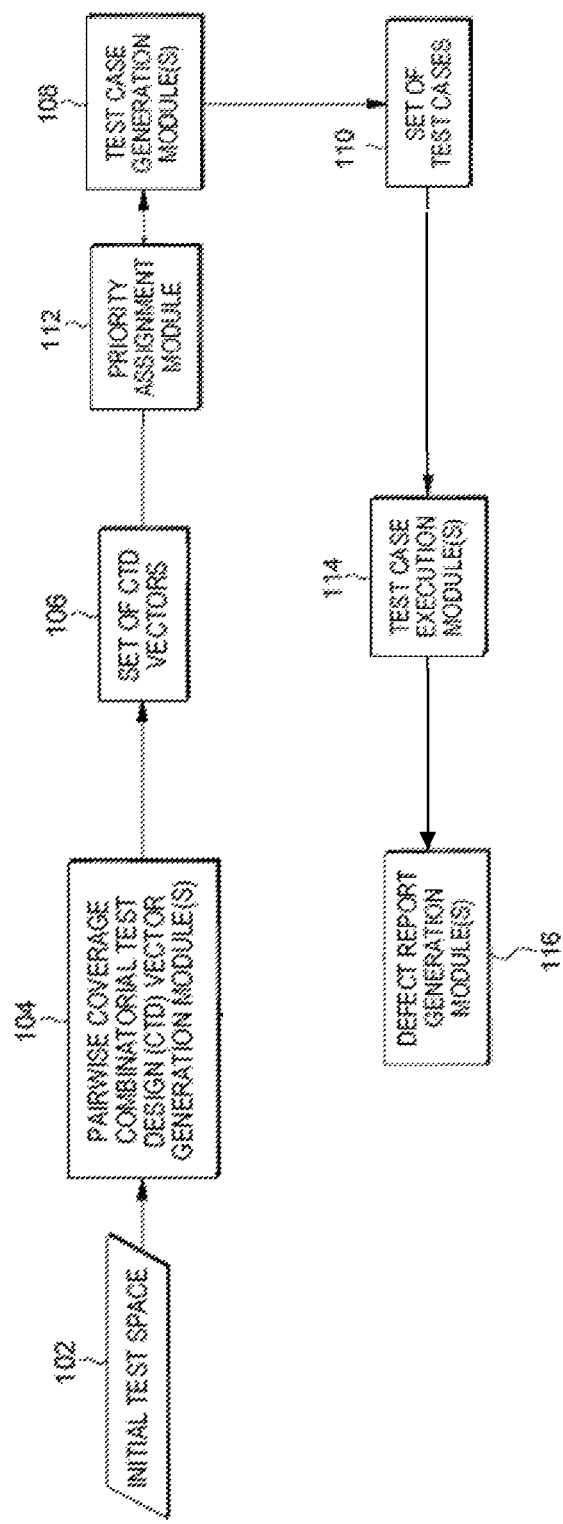
FIG. 1 is a schematic hybrid data flow/block diagram illustrating test case generation from combinatoric pairwise outputs in accordance with one or more example embodiments of the invention.

Example embodiments of the invention relate to, among other things, devices, systems, methods, computer-readable media, techniques, and methodologies for assigning test case priorities for testing performed on a system under test (SUT) through test case generation from combinatoric pairwise outputs using a combinatorial test design (CTD) model. The SUT may be a hardware system or a software system. In example embodiments, before each test case generation, a set of test vectors is generated that provides complete pairwise coverage of the test space. A model of the test-space, herein referred to as "model", may be useful for assisting in test planning, coverage analysis, or other test related activities. The model may define tests that are within the test-space, based on any aspect of the tests, such as but not limited to inputs, scenarios, configurations, or the like. The model comprises a set of functional attributes, respective domains of values for each attribute, and potentially restrictions on the value combinations. Each attribute may relate to a different aspect of a test, such as, for example, operation to be performed, input to be provided, or the like. Each test is represented by a valuation to each of the attributes of the model that together define the functionality of the test. The model may be used to identify redundant tests, to identify missing tests or aspects of the system that are uncovered by the test suite, or the like. The CTD model may also be used to assign priorities to the generated test cases. In one embodiment, a priority value may be set by assessing each attribute/value vector in the CTD model.

In example embodiments, inputs to a SUT are modeled as a collection of attribute-value pairs. More specifically, inputs to a SUT can be modeled as a collection of attributes, each of which is eligible to take on one or more corresponding attribute values to form attribute-value pairs. In example embodiments, the entire Cartesian product space that contains all possible combinations of attribute-value pairs can be reduced to a smaller set of test vectors that provides complete pairwise coverage of the test space across all attribute values. For instance, if it is assumed that four different attributes A, B, C, and D are modeled, and if it is further assumed that attribute A can take on four distinct values; attribute B can take on three distinct values; attribute C can take on three distinct values; and attribute D can take on two distinct values, then the total number of unique combinations of attribute values would be 4*3*3*2=72. Thus, in this illustrative example, the entire Cartesian product space would include 72 different combinations of attribute values. As previously noted, these 72 different combinations can be reduced down to a smaller set of combinations that still provide complete pairwise coverage of the Cartesian product space. For instance, the 72 different combinations can be reduced down to 12 distinct combinations that together include every possible pairwise interaction of attribute values. It should be appreciated that an initial set of test vectors that provides complete m-wise coverage across the attribute values can also be generated (where m>2), but would require a greater number of test vectors that increases logarithmically as m increases. In order to achieve complete n-wise coverage across all attribute values (where n represents a total number of attributes modeled), a set of test vectors containing all possible combinations of attribute values in the Cartesian product test space would need to be generated.

In example embodiments, the entire Cartesian product space including all combinations of attribute values are first reduced down to a set of CTD test vectors that provides complete pairwise coverage across all attribute values. In example embodiments, this initial set of CTD vectors provides partial but not complete m-wise coverage of the test space, where 2<m≤n, and n represents the total number of attributes being modeled. For instance, this initial set of CTD vectors may provide 10% 3-wise coverage of the test space, 5% 4-wise coverage of the test space, and so forth. In example embodiments, the amount of m-wise coverage provided by a given set of CTD vectors that provides complete pairwise coverage progressively decreases as m increases.

In example embodiments, a binary decision diagram or the like may be used to perform the reduction and identify the reduced set of CTD vectors that provides complete pairwise coverage and partial m-wise coverage, where 2<m≤n. In example embodiments, each CTD test vector that is generated includes a unique combination of attribute values, and the set of CTD test vectors together includes every possible pairwise interaction of attribute values and some portion of all possible m-wise interactions. In particular, each CTD vector may have a dimension corresponding to the number of attributes that are modeled, where each element of the CTD vector is a respective attribute value for a corresponding attribute. The set of CTD vectors that is generated, however, may not be unique. That is, in example embodiments, multiple different sets of CTD vectors, each of which provides complete pairwise coverage, can be generated.

In example embodiments, once the initial set of CTD test vectors is generated, it is used to generate a corresponding set of test cases. For instance, the set of CTD test vectors may be provided as input to a test case generation tool configured to generate a respective corresponding test case for each CTD vector. Each test case may be designed to test the interactions among the particular combination of attribute values contained in the corresponding CTD vector. In example embodiments, the particular combination of attribute values contained in the corresponding CTD vector may be provided as input to a priority assignment module. The priority assignment module may generate a priority value for each test case based on the information contained in the corresponding CTD vector. In example embodiments, the test cases are then executed.

In example embodiments, if during execution of the test cases one or more defects are detected, a corresponding defect report is automatically generated. The generated defect report may include priority information associated with the failing test case. In example embodiments, the priority information helps to correctly identify severity of each discovered software defect.

Example embodiments of the invention include various technical features that yield technical effects that provide various improvements to computer technology. For instance, example embodiments of the invention include the technical feature of generating a set of test vectors and corresponding sets of test cases that provide pairwise coverage of a test space. The technical feature of assigning priority values to failing tests provides an opportunity to prioritize discovered defects based on the features of the product under test that the discovered defects are associated with. In addition, the technical effect of automatically assigning priority values improves automatic generation of defect reports. Thus, the automated priority value assignment to test cases and automated defect report generation exposes a fault more efficiently and using a fundamentally different methodology than manual test case generation and manual defect report generation.

Figure 3:
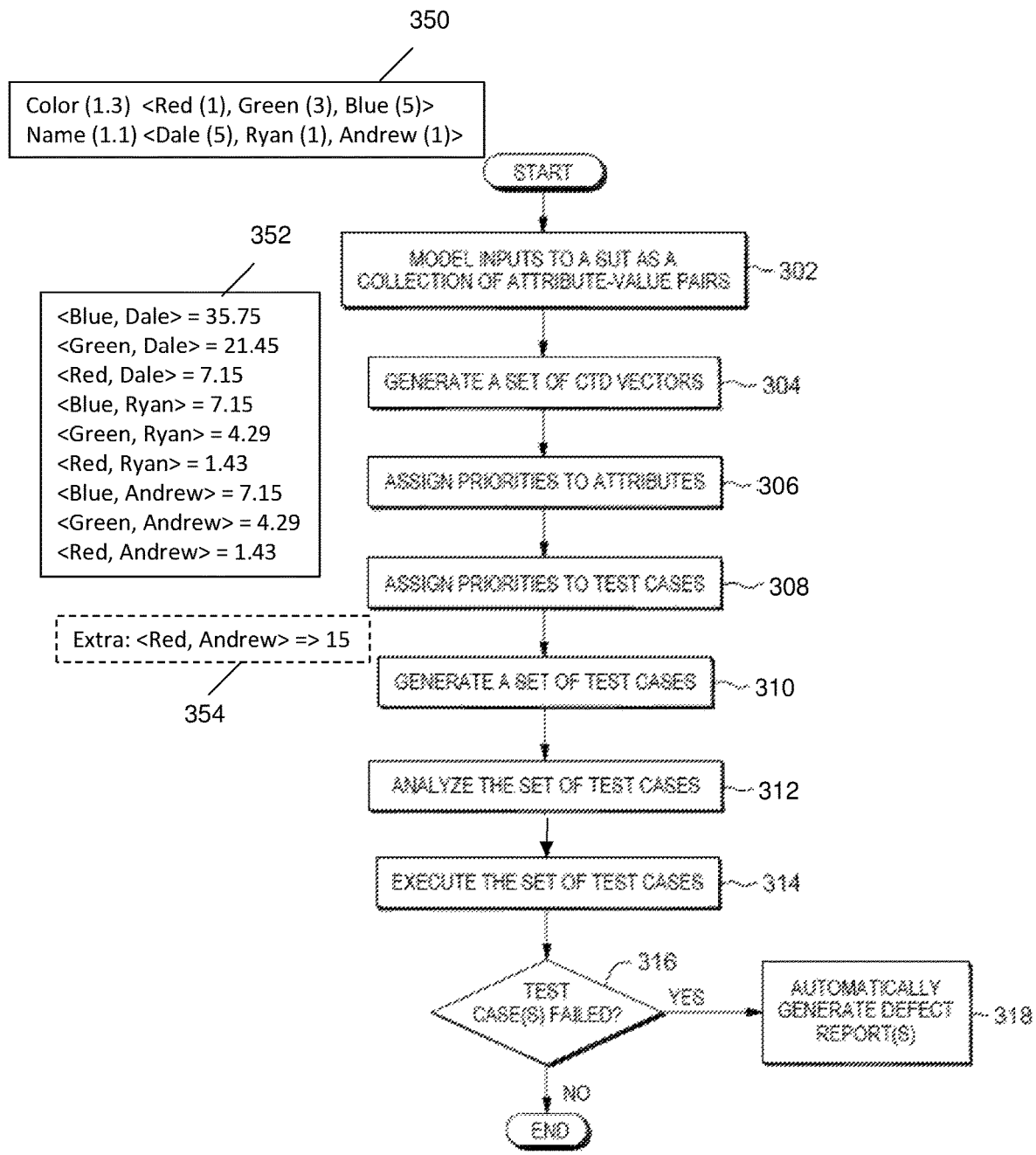
FIG. 3 is a process flow diagram of an illustrative method for assigning test case priorities in accordance with one or more example embodiments of the invention.

FIG. 1 is a schematic hybrid data flow/block diagram illustrating test case generation from combinatoric pairwise outputs in accordance with one or more example embodiments of the invention. FIG. 3 is a process flow diagram of an illustrative method 300 for assigning test case priorities in accordance with one or more example embodiments of the invention. FIG. 3 will be described in conjunction with FIG. 1 hereinafter.

Illustrative methods in accordance with example embodiments of the invention and corresponding data structures (e.g., program modules) for performing the methods will now be described. It should be noted that each operation of the method 300 depicted in FIG. 3 may be performed by one or more of the program modules or the like depicted in FIG. 1 or FIG. 4, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring now to FIG. 3 in conjunction with FIG. 1, at block 302 of the method 300, in example embodiments, inputs to a SUT are modeled as a collection of attribute-value pairs. More specifically, inputs to a SUT can be modeled as a collection of attributes, each of which is eligible to take on one or more corresponding attribute values to form attribute-value pairs. In example embodiments, the collection of all possible unique combinations of attribute values represents an entire Cartesian product space. In certain example embodiments, the entire Cartesian product space represents an initial test space 102.

At block 304 of the method 300, in example embodiments, the initial test space 102 containing all valid combinations of attribute values is reduced to a smaller set of CTD vectors 106 that provides complete pairwise coverage across all attribute values. More specifically, in example embodiments, computer-executable instructions of one or more pairwise coverage CTD vector generation modules 104 are executed at block 304 to generate the set of CTD test vectors 106, which provides complete pairwise coverage but includes a substantially reduced number of test vectors as compared to the total number of valid combinations of attribute values in the initial test space 102.

For instance, if it is assumed that four different attributes A, B, C, and D are modeled, and if it is further assumed that attribute A can take on four distinct values; attribute B can take on four distinct values; attribute C can take on three distinct values; and attribute D can take on two distinct values, then the total number of unique combinations of attribute values would be 4*4*3*2=96. Thus, in this illustrative example, the entire Cartesian product space would include 96 different unique combinations of attribute values. The initial test space 102 may include all 96 combinations or a lesser number if any combination(s) is excluded that violates an architectural restriction on the SUT. At block 304 of the method 300, the total number of combinations in the initial test space 102 can be reduced down to a smaller set of combinations that still provide complete pairwise coverage of the test space. For instance, the 96 different combinations can be reduced down to 16 distinct combinations included in the set of CTD vectors 106 that together include every possible pairwise interaction of attribute values.

In example embodiments, a binary decision diagram or the like may be used to perform the reduction and identify the reduced set of CTD vectors 106 that provides complete pairwise coverage and partial m-wise coverage, where $2 < m \leq n$.... In example embodiments, each CTD test vector that is generated includes a unique combination of attribute values, and the set of CTD test vectors together includes every possible pairwise interaction of attribute values and some portion of all possible m-wise interactions. In particular, each CTD vector may have a dimension corresponding to the number of attributes that are modeled, where each element of the CTD vector is a respective attribute value for a corresponding attribute.

Figure 2:
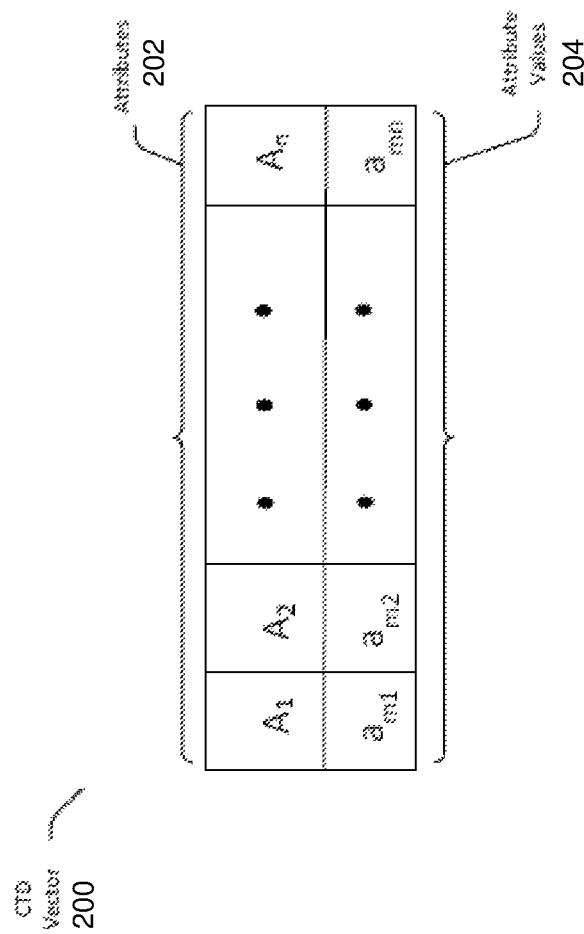
FIG. 2 is a schematic diagram of an example combinatorial test design (CTD) vector in accordance with one or more example embodiments of the invention.

FIG. 2 depicts an example generic CTD vector 200 of the type that may be included in the set of CTD vectors 106. The example CTD vector 200 includes a plurality of attributes 202. As previously described, the attributes 202 may be used to model inputs to a SUT. The attributes 202 may be associated with attribute values 204. In particular, each attribute 202 may have a corresponding attribute value 204, which may be one of one or more candidate attribute values that the attribute is allowed to take on.

Referring again to FIG. 3, at block 306, priority values may be assigned by the priority assignment module 112 to attributes corresponding to the initial set of test cases. The assignment of priority values to various functional attributes can be based on various criteria preferably set according to the actual needs of the testing. For example, if the short-term goal is to test a new feature (e.g., connections over a particular media interface), all the attributes associated with the new feature can be assigned a high priority value (for example, 10). It will be appreciated that how exactly the priorities of the attributes are assigned to meet a particular testing objective is not critical to embodiments of the present invention. Consider an example where attributes "Color" and "Name" are tested in pairs. The values of the attributes are assigned priority values as shown at 350. As can be seen, the attributes themselves are assigned priority values, for example, color=>1.3, and name=>1.1. Further, values of each attribute are also assigned priority values. For example, red=>1, green=>3, and blue=>5; Dale=>5, Ryan=>1, and Andrew=>1.

At block 308, the priority assignment module 112 computes and assigns a priority to each test case in the set of test cases using the CTD vectors 200. In one embodiment, the priority assignment module determines a test case priority value by calculating a magnitude (e.g., cross product or dot product) of the corresponding CTD vector 200. For example, in the above scenario, as shown in block 352, the test cases with particular attributes are based on the priority values of the attributes and the values involved. For instance, a test case with the attribute-value pair <Blue, Dale>=>35.75=(Color=1.3×Blue=5)×(Name=1.1×Dale 5). Priority values for other test cases is computed in the same manner. In one or more embodiments of the present invention, the attributes themselves are assigned a priority value '1', and the test case priority values can be accordingly computed just with the priority values of the attribute-values.

Accordingly, in one embodiment, the priority values generated by the priority assignment module 112 can used by the test case generation module 108 to identify the importance of various test case(s) performed on a SUT, wherein the greater the priority of such a test case, the more important that the test case is executed by the test case execution module 114. In other words, within the set of test cases, the test cases having attributes having higher priority values are executed earlier (during execution of the set of test cases) in comparison to the test cases with attributes having lower priority values.

It will be further appreciated that priority values of different attributes may be modified during different stages of a testing cycle. For example, a user may change the priority value of the test case <Ryan, Andrew> to 15 (from 1), at block 354. The user may make the change, for instance, because of an edge case that the user would prefer to test. It is understood that the attributes, values, and priority values in the example are for illustration, and that in other embodiments of the present invention such values can be different.

At block 310 of the method 300, in example embodiments, computer-executable instructions of one or more test case generation modules 108 may be executed to generate, from the initial set of CTD test vectors 106, a corresponding set of test cases 110, which are then executed by the test case execution module(s) 112 to yield an execution result (pass or fail) for each test case. For instance, the set of CTD test vectors 106 may be provided as input to a test case generation tool configured to generate a respective corresponding test case for each CTD vector. Each vector in the set of CTD vectors defines possible combinations of values of the attributes as covered by the set of test cases. Each test case in the set of test cases 110 may be designed to test the interactions among the particular combination of attribute values contained in a corresponding CTD vector of the set of CTD vectors 106. It should be appreciated that a set of CTD vectors and their corresponding test cases may, at times herein, be described and/or depicted interchangeably. For instance, the example CTD vector 200 depicted in FIG. 2 may be interchangeably thought of as the corresponding test case that tests the particular combinations of attribute values represented by the CTD vectors 200.

Then, at block 312 of the method 300, in example embodiments, each of the test cases included in the set of test cases is analyzed using the CTD model. The analysis can include a determination of a number and kind of functional attributes associated with each analyzed test case, as well as values of these attributes and their relationships. In one embodiment, at least a portion of the functional attributes of a particular CTD vector may indicate a setup activity to be performed prior to running the corresponding test case, thereby allowing distinction between different types of attributes. The resulting analysis can be presented to a priority assignment module 112 associated with the testing framework.

At block 314, in example embodiments, computer-executable instructions of one or more test case execution modules 112 are executed to execute the set of test cases 110. In one embodiment, a large number of test cases can be executed based on their priority values (e.g., from the highest priority test cases to the lowest priority test cases).

At block 316, the test execution module 114 determines if any of the test cases have failed to execute. Responsive to a negative determination at block 316, the method 300 may end because none of the initial set of test cases 110 has failed. However, if one or more test cases in the set of test cases has failed (decision block 316, "Yes" branch), a defect report generation module 116 may automatically generate a software defect report describing the detected failure. In one embodiment, the generated software defect report may include the priority value assigned to the failed test case. In one or more examples, a test case model is updated based on the defect report.

One or more illustrative embodiments of the invention are described herein. Such embodiments are merely illustrative of the scope of this invention and are not intended to be limiting in any way. Accordingly, variations, modifications, and equivalents of embodiments disclosed herein are also within the scope of this invention.

Figure 4:
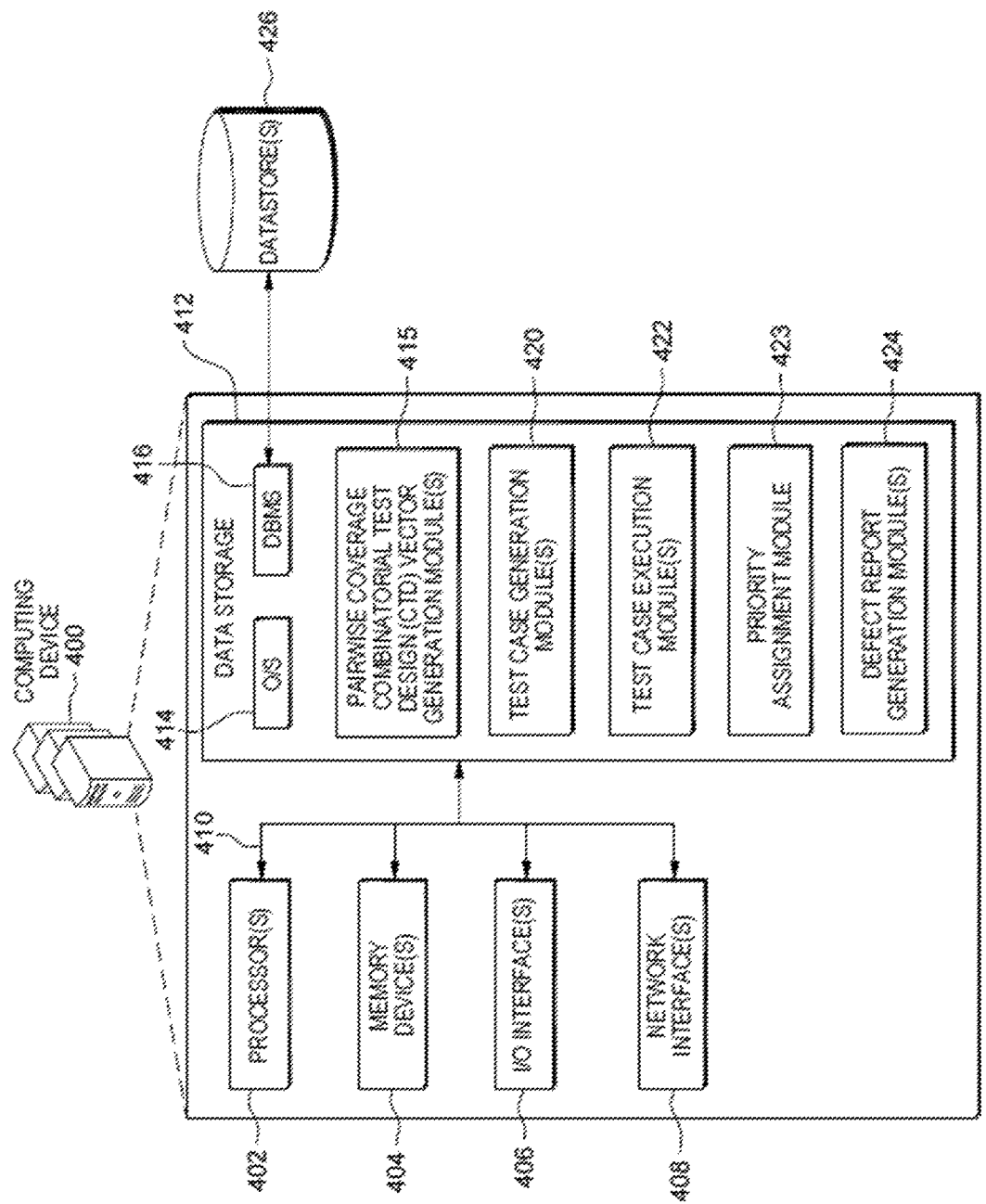
FIG. 4 is a schematic diagram of an illustrative computing device configured to implement one or more example embodiments of the invention.

FIG. 4 is a schematic diagram of an illustrative computing device 400 configured to implement one or more example embodiments of the invention. The illustrative computing device 400 may include a server or collection of servers; a personal computer; a handheld device; or the like. While the computing device 400 and/or any particular component of the computing device 400 may be described herein in the singular, it should be appreciated that multiple instances of the computing device 400 and/or any component thereof may be provided and functionality described in connection with the computing device 400 may be distributed across multiple computing devices 400 and/or across multiple instances of any particular component of the computing device 400.

In an illustrative configuration, the computing device 400 may include one or more processors (processor(s)) 402, one or more memory devices 404 (generically referred to herein as memory 404), one or more input/output ("I/O") interfaces 406, one or more network interfaces 408, and data storage 412. The computing device 400 may further include one or more buses 410 that functionally couple various components of the computing device 400.

The bus(es) 410 may include at least one of a system bus, a memory bus, an address bus, or a message bus, and may permit the exchange of information (e.g., data (including computer-executable code), signaling, etc.) between various components of the computing device 400. The bus(es) 410 may include, without limitation, a memory bus or a memory controller, a peripheral bus, an accelerated graphics port, and so forth. The bus(es) 410 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 404 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 404 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 404 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 412 may include removable storage and/or non-removable storage including, but not limited to, magnetic storage, optical disk storage, and/or tape storage. The data storage 412 may provide non-volatile storage of computer-executable instructions and other data. The memory 404 and the data storage 412, removable and/or non-removable, are examples of computer-readable storage media (CRSM) as that term is used herein.

The data storage 412 may store computer-executable code, instructions, or the like that may be loadable into the memory 404 and executable by the processor(s) 402 to cause the processor(s) 402 to perform or initiate various operations. The data storage 412 may additionally store data that may be copied to memory 404 for use by the processor(s) 402 during the execution of the computer-executable instructions. Moreover, output data generated as a result of execution of the computer-executable instructions by the processor(s) 402 may be stored initially in memory 404 and may ultimately be copied to data storage 412 for non-volatile storage.

More specifically, the data storage 412 may store one or more operating systems (O/S) 414; one or more database management systems (DBMS) 416 configured to access the memory 404 and/or one or more external datastores 426; and one or more program modules, applications, engines, managers, computer-executable code, scripts, or the like such as, for example, one or more n-wise coverage CTD vector generation modules 415; one or more test case generation modules 420; one or more test case execution modules 422; one or more priority assignment modules 423; and one or more defect report generation modules 424. Any of the components depicted as being stored in data storage 412 may include any combination of software, firmware, and/or hardware. The software and/or firmware may include computer-executable instructions (e.g., computer-executable program code) that may be loaded into the memory 404 for execution by one or more of the processor(s) 402 to perform any of the operations described earlier in connection with correspondingly named modules/engines.

Although not depicted in FIG. 4, the data storage 412 may further store various types of data utilized by components of the computing device 400 (e.g., data stored in the datastore(s) 426). Any data stored in the data storage 412 may be loaded into the memory 404 for use by the processor(s) 402 in executing computer-executable instructions. In addition, any data stored in the data storage 412 may potentially be stored in the external datastore(s) 426 and may be accessed via the DBMS 416 and loaded in the memory 404 for use by the processor(s) 402 in executing computer-executable instructions.

The processor(s) 402 may be configured to access the memory 404 and execute computer-executable instructions loaded therein. For example, the processor(s) 402 may be configured to execute computer-executable instructions of the various program modules, applications, engines, managers, or the like of the computing device 400 to cause or facilitate various operations to be performed in accordance with one or more embodiments of the invention. The processor(s) 402 may include any suitable processing unit capable of accepting data as input, processing the input data in accordance with stored computer-executable instructions, and generating output data. The processor(s) 402 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 402 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 402 may be capable of supporting any of a variety of instruction sets.

Referring now to other illustrative components depicted as being stored in the data storage 412, the O/S 414 may be loaded from the data storage 412 into the memory 404 and may provide an interface between other application software executing on the computing device 400 and hardware resources of the computing device 400. More specifically, the O/S 414 may include a set of computer-executable instructions for managing hardware resources of the computing device 400 and for providing common services to other application programs. In certain example embodiments, the O/S 414 may include or otherwise control the execution of one or more of the program modules, engines, managers, or the like depicted as being stored in the data storage 412. The O/S 414 may include any operating system now known or which may be developed in the future including, but not limited to, any server operating system, any mainframe operating system, or any other proprietary or non-proprietary operating system.

The DBMS 416 may be loaded into the memory 404 and may support functionality for accessing, retrieving, storing, and/or manipulating data stored in the memory 404, data stored in the data storage 412, and/or data stored in external datastore(s) 426. The DBMS 416 may use any of a variety of database models (e.g., relational model, object model, etc.) and may support any of a variety of query languages. The DBMS 416 may access data represented in one or more data schemas and stored in any suitable data repository. Data stored in the datastore(s) 426 may include, for example, CTD vectors; CTD vector attribute priority values; test case priority values and so forth, any portion of which may alternatively or additionally be stored in the data storage 412. External datastore(s) 426 that may be accessible by the computing device 400 via the DBMS 416 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 400, the input/output (I/O) interface(s) 406 may facilitate the receipt of input information by the computing device 400 from one or more I/O devices as well as the output of information from the computing device 400 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 400 or may be separate. The I/O devices may further include, for example, any number of peripheral devices such as data storage devices, printing devices, and so forth.

The I/O interface(s) 406 may also include an interface for an external peripheral device connection such as universal serial bus (USB), FireWire, Thunderbolt, Ethernet port or other connection protocol that may connect to one or more networks. The I/O interface(s) 406 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 400 may further include one or more network interfaces 408 via which the computing device 400 may communicate with any of a variety of other systems, platforms, networks, devices, and so forth. The network interface(s) 408 may enable communication, for example, with one or more other devices via one or more of networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

It should be appreciated that the program modules/engines depicted in FIG. 4 as being stored in the data storage 412 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the computing device 400 and/or other computing devices may be provided to support functionality provided by the modules depicted in FIG. 4 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 4 may be implemented, at least partially, in hardware and/or firmware across any number of devices.

It should further be appreciated that the computing device 400 may include alternate and/or additional hardware, software, or firmware components beyond those described or depicted without departing from the scope of the invention. More particularly, it should be appreciated that software, firmware, or hardware components depicted as forming part of the computing device 400 are merely illustrative and that some components may not be present or additional components may be provided in various embodiments. While various illustrative modules have been depicted and described as software modules stored in data storage 412, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of the method 300 may be performed by one or more computing devices 400 having the illustrative configuration depicted in FIG. 4, or more specifically, by one or more program modules, engines, applications, or the like executable on such a device. It should be appreciated, however, that such operations may be implemented in connection with numerous other device configurations.

The operations described and depicted in the illustrative method of FIG. 3 may be carried out or performed in any suitable order as desired in various example embodiments of the invention. Additionally, in certain example embodiments, at least a portion of the operations may be carried out in parallel. Furthermore, in certain example embodiments, less, more, or different operations than those depicted in FIG. 3 may be performed.

Although specific embodiments of the invention have been described, one of ordinary skill in the art will recognize that numerous other modifications and alternative embodiments are within the scope of the invention. For example, any of the functionality and/or processing capabilities described with respect to a particular system, system component, device, or device component may be performed by any other system, device, or component. Further, while various illustrative implementations and architectures have been described in accordance with embodiments of the invention, one of ordinary skill in the art will appreciate that numerous other modifications to the illustrative implementations and architectures described herein are also within the scope of this invention. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an—Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for assigning test case priority, the computer-implemented method comprising:
    analyzing, by a processor, based on a set of test vectors, one or more test cases from a set of test cases on source code to determine a particular combination of attribute values associated with the one or more analyzed test cases;
    generating, by the processor, a first priority value for each attribute in the determined particular combination of attribute values;
    generating, by the processor, a second priority value for each value of the attribute in the determined particular combination of attribute values;
    generating and assigning, by the processor, a test case priority value for each test case of the one or more analyzed test cases based on the first priority value and the second priority value of the determined particular combination of attribute values associated with the one or more analyzed test cases; and
    executing, by the processor, the one or more analyzed test cases based on the test case priority value assigned to each test case of the one or more analyzed test cases.

2. The computer-implemented method of claim 1, wherein each test vector in the set of test vectors includes the determined particular combination of attribute values and a respective one or more additional attribute values.

3. The computer-implemented method of claim 1, wherein the test case priority value is assigned based on a magnitude of a corresponding test vector.

4. The computer-implemented method of claim 1, further comprising:
    executing one or more test cases from the set of test cases to obtain a set of execution results;

determining that the one or more test cases from the set of test cases fail to successfully execute; and automatically generating a defect report for the one or more test cases from the set of test cases that failed to successfully execute, wherein the defect report includes the generated test case priority value associated with a corresponding test case.

5. The computer-implemented method of claim 1, wherein the set of test cases is generated based on the set of test vectors.

6. The computer-implemented method of claim 5, wherein the set of test vectors defines possible combinations of attribute values as covered by the set of test cases.

7. A system for assigning test case priority, the system comprising:
- at least one processor; and
- at least one memory storing computer-executable instructions, wherein the at least one processor is configured to access the at least one memory and execute the computer-executable instructions to:
  - analyze, based on a set of test vectors, one or more test cases from a set of test cases on source code to determine a particular combination of attribute values associated with the one or more analyzed test cases;
  - generate a first priority value for each attribute in the determined particular combination of attribute values;
  - generate a second priority value for each value of the attribute in the determined particular combination of attribute values;
  - generate and assign a test case priority value for each test case of the one or more analyzed test cases based on the first priority value and the second priority value of the determined particular combination of attribute values associated with the one or more analyzed test cases; and
  - execute the one or more analyzed test cases based on the test case priority value assigned to each test case of the one or more analyzed test cases.

8. The system of claim 7, wherein each test vector in the set of test vectors includes the determined particular combination of attribute values and a respective one or more additional attribute values.

9. The system of claim 7, wherein the test case priority value is assigned based on a magnitude of a corresponding test vector.

10. The system of claim 7, wherein the at least one processor is further configured to:
- execute one or more test cases from the set of test cases to obtain a set of execution results;
- determine that the one or more test cases from the set of test cases fail to successfully execute; and
- automatically generate a defect report for the one or more test cases from the set of test cases that failed to successfully execute, wherein the defect report includes the generated test case priority value associated with a corresponding test case.

11. The system of claim 7, wherein the set of test cases is generated based on the set of test vectors.

12. The system of claim 11, wherein the set of test vectors defines possible combinations of attribute values as covered by the set of test cases.

13. A computer program product for assigning test case priority, the computer program product comprising a computer readable storage medium readable by a processing circuit, the computer readable storage medium storing instructions executable by the processing circuit to cause a method to be performed, the method comprising:
- analyzing, based on a set of test vectors, one or more test cases from a set of test cases on source code to determine a particular combination of attribute values associated with the one or more analyzed test cases;
- generating a first priority value for each attribute in the determined particular combination of attribute values;
- generating a second priority value for each value of the attribute in the determined particular combination of attribute values;
- generating and assigning a test case priority value for each test case of the one or more analyzed test cases based on the first priority value and the second priority value of the determined particular combination of attribute values associated with the one or more analyzed test cases; and
- executing the one or more analyzed test cases based on the test case priority value assigned to each test case of the one or more analyzed test cases.

14. The computer program product of claim 13, wherein each test vector in the set of test vectors includes the determined particular combination of attribute values and a respective one or more additional attribute values.

15. The computer program product of claim 13, wherein the test case priority value is assigned based on a magnitude of a corresponding test vector.

16. The computer program product of claim 13, the method further comprising:
- executing one or more test cases from the set of test cases to obtain a set of execution results;
- determining that the one or more test cases from the set of test cases fail to successfully execute; and
- automatically generating a defect report for the one or more test cases from the set of test cases that failed to successfully execute, wherein the defect report includes the generated test case priority value associated with a corresponding test case.

17. The computer program product of claim 13, wherein the set of test cases is generated based on the set of test vectors.

* * * * *